Feb. 20, 1968     J. H. MAELAND     3,369,596
APPARATUS FOR HEATING, HOMOGENIZING, AND COOLING ICE CREAM
Filed April 28, 1964
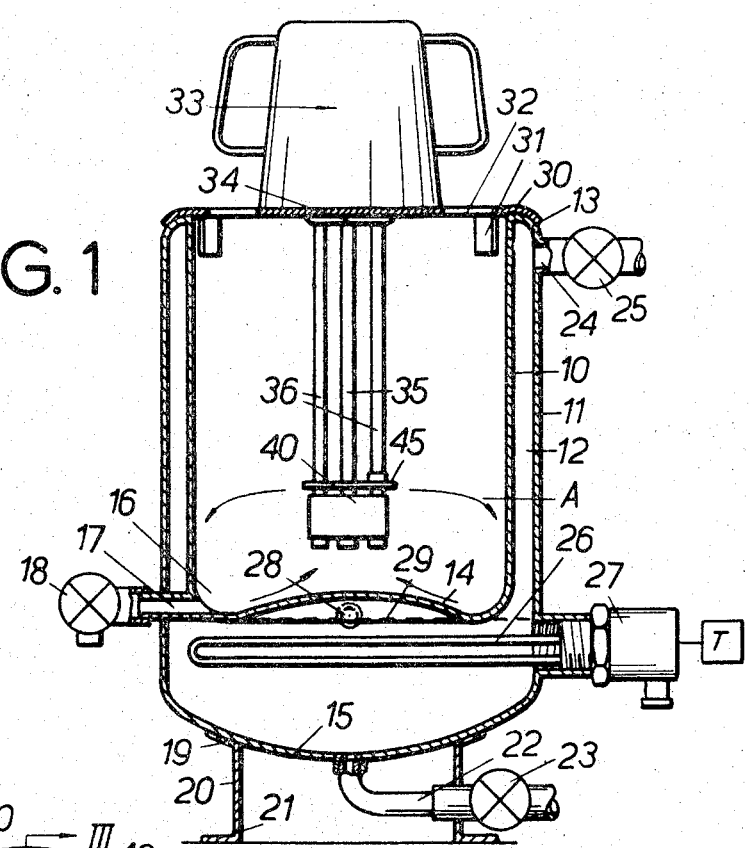
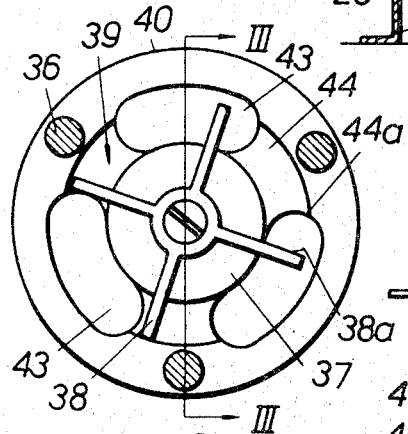
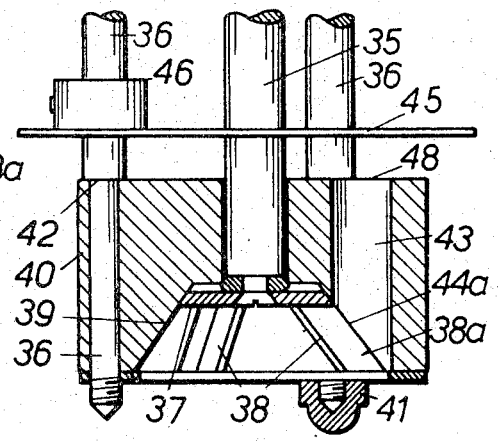
INVENTOR:
Jörgen Hagerup Mæland.
BY
Frederick Breitenfeld
Attorney United States Patent Office 3,369,596
Patented Feb. 20, 1968

3,369,596
APPARATUS FOR HEATING, HOMOGENIZING, AND COOLING ICE CREAM
Jørgen Hagerup Maeland, Foreningsgaten 1, Bergen, Norway
Filed Apr. 28, 1964, Ser. No. 363,198
Claims priority, application Norway, Apr. 29, 1963, 148,383
1 Claim. (Cl. 165—64)

ABSTRACT OF THE DISCLOSURE

Inner container surrounded by outer container to define jacket between them. Water inlet and outlet in outer container. Heating element located between bottoms of two containers. Control outlet in outer container located between heater level and bottom of inner container. Container cover carries homogenizing apparatus including a rotor in lower half of inner container, a housing having vertical passageways over the rotor, and a plate spaced above the housing.

---

This invention relates to the manufacture of ice cream and especially mixes of the soft ice cream type. Previously ice cream mixes have been made in three separate stages, namely a heating or pasteurization stage, a homogenization stage and a cooling-down stage. This has necessitated the use of three apparatuses, one for each stage, mounted in side-by-side relationship and has rendered the final assembly extremely clumsy as well as complicated and expensive. It is self-evident that such an arrangement places great demands on premises such as snack bars and shops, where counter space is at a premium and, furthermore, the assembly is also difficult to clean after use.

According to the present invention a process for producing an ice cream mix comprises the steps of heating together the ingredients therefor to a predetermined temperature and maintaining said temperature, homogenizing the resulting mass to cause simultaneous circulation thereof and the formation of a mix having a paste-like consistency and cooling down the mix, the homogenization step being initiated prior to the completion of the heating step and being continued during at least part of the cooling-down step.

Also according to the invention an apparatus for producing an ice cream mix comprises an inner container open at the top for receiving mix-forming ingredients and, surrounding the bottom and the sides thereof, an outer container forming with the inner container a closed chamber, said outer container communicating with valve-controlled feed and discharge means capable of intermittently supplying to and withdrawing from said chamber a fluid heat-transfer medium, and removable closure means for said inner container mounted on the top of the outer container and carrying an homogenizing means projecting into the lower half of the inner container and adapted to circulate as well as homogenize the mix-forming ingredients.

In order that the invention can be more clearly understood, a convenient embodiment thereof will now be described, by way of example, with reference to the accompanying drawing in which:

FIGURE 1 is a vertical section of an apparatus constructed in accordance with the invention, FIGURE 2 is an enlarged view of the apparatus of FIGURE 1 from below and partly in section, and FIGURE 3 is a section on the line III—III of FIGURE 2.

Referring to FIGURE 1, the apparatus is made up of an inner container 10 which is received in an outer container 11, so that there is formed between the containers a closed chamber 12 which encloses the inner container underneath and along the sides. The side walls of the inner container and the outer container are preferably cylindrical. At the top, the inner container is welded to the outer container at its inwardly bent top edge 13, so that the outer wall of the inner container is disposed at a certain radial distance from the inner wall of the outer container over the extent of the height of the inner container. Between the bottom 14 of the inner container and the bottom 15 of the outer container, the chamber 12 is enlarged quite considerably. This is partially achieved by the bottom 15 of the inner container being downwardly convex. At the lower peripheral portion of the inner container there is formed an accumulation pocket 16 around an upwardly curved bottom portion. From this accumulation pocket 16 there extends a discharge pipe 17 through the wall of the inner container and the chamber 12 as well as the wall of the outer container, to a tapping-off arrangement or metering arrangement which in the drawing is only indicated by a valve 18. The bottom 15 of the outer container rests against an upper flange 19 of a cylindrical foot piece 20, a lower flange 21 of which can be secured to a counter or the like with screws or other fastening means. The foot piece 20 has as shown in the drawing a smaller diameter than the outer container and said inner container, so that it occupies the least possible counter space. From the chamber 12 at the bottom 15 of the outer container there extends a feed pipe 22 downwardly and outwardly through the foot piece 20 to a connection for a cold water feed via a cock or valve 23, preferably a turn cock which permits complete draining of the chamber 12. At the top of the chamber 12 there extends through the outer container a discharge pipe 24 which is equipped with a cock or valve 25.

A distance below the bottom 14 of the inner container, there extends a heating element 26 inwardly into the chamber 12 through a packing box 27 in the outer container. Just at the bottom of the inner container and a distance above the heating element, a discharge pipe 28 extends outwardly from the outer container to a valve (not shown). The discharge pipe 28 is arranged to form an overflow, so that the water level in the chamber 12 can be controlled. The lowest water level in the chamber 12 is shown in FIGURE 1 in dotted lines 29. In addition to the cock or valve for controlling the water level, the discharge pipe 28 is also provided with a safety valve (not shown) for controlling the pressure in the chamber 12.

The top opening of the inner container, which corresponds to the cross-section thereof, is covered with a removable lid 30 which rests against the top edge 13 of the outer container. The lid is centred in the inner container by means of downwardly directed pegs 31. In the lid, inspection openings 32 are cut out which can also serve as feed opening to the inner container.

Centrally in the lid a stirring and homogenization apparatus 33 is secured, the motor of which is fixed on the upper side of the lid 30. Through a gasket 34, a shaft 35 of the apparatus extends downwardly into the inner container 10 parallel with and centrally within a triangle which is formed by three guide rods 36. As shown in FIGURES 2 and 3, there is secured to the lower end of the shaft 35, a rotor 37 with blades 38 which extend obliquely outwardly and downwardly from the shaft 35. The rotor is received in a cavity 39 in the lower portion of a housing 40 which is supported by the guide rods 36. The housing is secured to the guide rods by means of nuts 41 which tighten the housing against stops 42 at the lower ends of the guide rods. The cavity 39 in the housing 40 opens vertically downwards from the rotor 37. From the cavity 39, three branch passages 43, which are separated by vertical dividing walls 44, extend vertically upwards through the housing 40 radially outside the rotor 37.

When the blades 38 rotate in the cavity 39, the mass will be hurled through the passages 43, so that circulation of the mass is obtained through the housing 40. By making the edges 38a of the blades and the dividing wall edges 44a sharp and by allowing a suitable small clearance between the blades 38 and the edges 44a, a cutting effect on the mass of particles can be achieved at the same time as the circulation, since such particles will be able to be "clipped" between the cutting edges 38a and 44a.

A disc 45 is axially displaceably received on the guide rods 36 and the shaft 35. The disc can be fastened to the one guide rod 36 with a retaining sleeve 46 which can be secured by a key 47. In this way it is possible to secure the disc 45 at different desired positions above the housing 40. Owing to the disc extending at right angles in front of discharge mouths 48 of the passages 43, the current through the passages must be deflected rather sharply and by allowing the rotating shaft 35 of the apparatus to turn with a rather high speed of revolution, so that a strong circulation is obtained through the passages 43, a partial breakdown of the raw materials is obtained as desired and partial smooth and homogeneous mixing together of the materials.

By lowering the rotor almost down to the bottom of the container 10, efficient circulation of the ice cream mass is obtained along the bottom of the container to its middle, through the housing 40 and along the disc in a substanially horizontal current outwards towards the wall of the container as is indicated by the arrows A. The circulation will also gradually draw with it the overlying layer of the ice cream mass, so that an effective mixing and stirring of the contents of the container is obtained.

In operation, the raw materials which include inter alia dried milk and milk together with butter are introduced into the inner container and the lid 30 with the apparatus 33 is mounted in position. In order to mix the dried milk and the rest in such a way that a paste-like mass of uniform consistency is obtained, it is necessary to heat the mixture so that it homogenizes more readily. For this reason the chamber 12 is filled with water up to the level 29, that is until the water runs over into the overflow 28, and the heating element 26 is switched on. The heating element can, for example, be thermostatically controlled such as by thermostat T and can be set for heating to, for example, 90° C. so that no boiling of the water takes place. Simultaneously with the heating, when this is suitably far advanced the apparatus can be started so that mixing of the raw materials is brought about and, at the same time, a suitable circulation along the wall of the inner container so as to achieve uniform heating of the mass. When the heating is completed and the heating element is disconnected, the homogenization can still continue for a time before the warm water in the chamber is released. This is effected by opening the valve 25 at the upper end of the chamber at the same time as cold water is fed through the feed pipe 22. By circulating the cold water for a sufficiently long time in the chamber, the warm water is expelled and the heating element, outer container, inner container and contents are simultaneously cooled down gradually. During this cooling-down operation, the apparatus 33 can continue functioning so as to provide a more rapid cooling of the contents of the inner container by circulation. At the same time as the intended circulation is effected, constant homogenization of the mass is achieved in addition, so that the homogenization stage can be over-palled to a smaller or greater degree by the heating stage and the cooling-down stage respectively.

Unlike the assembly of apparatuses previously employed the embodiment described above incorporates all three in one and the same unit, so that, in consequence, less space is required and, moreover, all the pipe connections between the individual apparatuses of the prior construction are dispensed with thus rendering the unit easier to clean. All the stages of manufacture are carried out while the soft ice cream mixture is located in one and the same container and the fact that the product can be excluded from the surroundings permits a more hygienic handling thereof which is of particular importance since ice cream, being based on dairy products, is particularly susceptible to bacterial attack.

The embodiment of the invention in which an exclusive property of privilege is claimed are defined as follows:

What I claim is:

1. An apparatus for producing an ice cream mix, comprising an inner container open at the top for receiving mix-forming ingredients, an outer container surrounding the bottom and sides of said inner container and defining together with the inner container a closed chamber, valve-controlled feed and discharge means communicating with said outer container, said feed means being connected to a supply of water, a heating element located between the bottom of the inner container and the bottom of the outer container for raising the temperature of the water supplied through said feed means, a thermostat for controlling the temperature of said heating element and preventing that temperature from rising above the boiling point of the water in said outer container, a valve-controlled conduit in said outer container for regulating the level of water in the chamber, said conduit being located between the heating element and the bottom of the inner container and being unconnected to any liquid inlet source, a removable closure means for said inner container mounted on the top of the outer container, and an homogenizing means carried by said closure means projecting into the lower half of the inner container and adapted to circulate as well as homogenize the mix-forming ingredients, said homogenizing means including a prime mover mounted on the upper side of the removable closure means, a rotatable shaft adapted to be driven by said prime mover and having a rotor at its lower end formed with integral vanes, a housing rigidly suspended from said closure means and formed with a downwardly opening cavity adapted to receive said rotor for rotation therein, and a vertically adjustable disc mounted substantially horizontally above the housing, the housing being formed with a plurality of individual passages extending from the cavity to a corresponding number of orifices in the housing opposite said disc, rotation of the rotor causing the mix-forming ingredients to be circulated along the bottom of the inner container, through the housing, and horizontally along the disc toward the container wall.

References Cited

UNITED STATES PATENTS

| | | | |
|---|---|---|---|
| 2,249,036 | 7/1941 | Peters | 165—109 X |
| 2,467,492 | 4/1949 | Olson | 165—61 X |
| 2,472,362 | 6/1949 | Barnebey et al. | 165—109 X |
| 2,623,449 | 12/1952 | Losee | 165—64 X |
| 3,197,181 | 7/1965 | Hill | 259—95 |
| 3,249,340 | 5/1966 | Pinto | 259—95 |

FOREIGN PATENTS

| | | |
|---|---|---|
| 777,271 | 6/1957 | Great Britain. |
| 366,823 | 3/1963 | Switzerland. |

ROBERT A. O'LEARY, *Primary Examiner.*

A. W. DAVIS, JR., *Assistant Examiner.*